March 15, 1955     T. P. HOWARD     2,704,197
WEIGHING MACHINE

Filed Nov. 28, 1950     7 Sheets-Sheet 1

INVENTOR.
Thomas P. Howard
BY J. Stanley Churchill
ATTORNEY

March 15, 1955 T. P. HOWARD 2,704,197
WEIGHING MACHINE
Filed Nov. 28, 1950 7 Sheets-Sheet 2
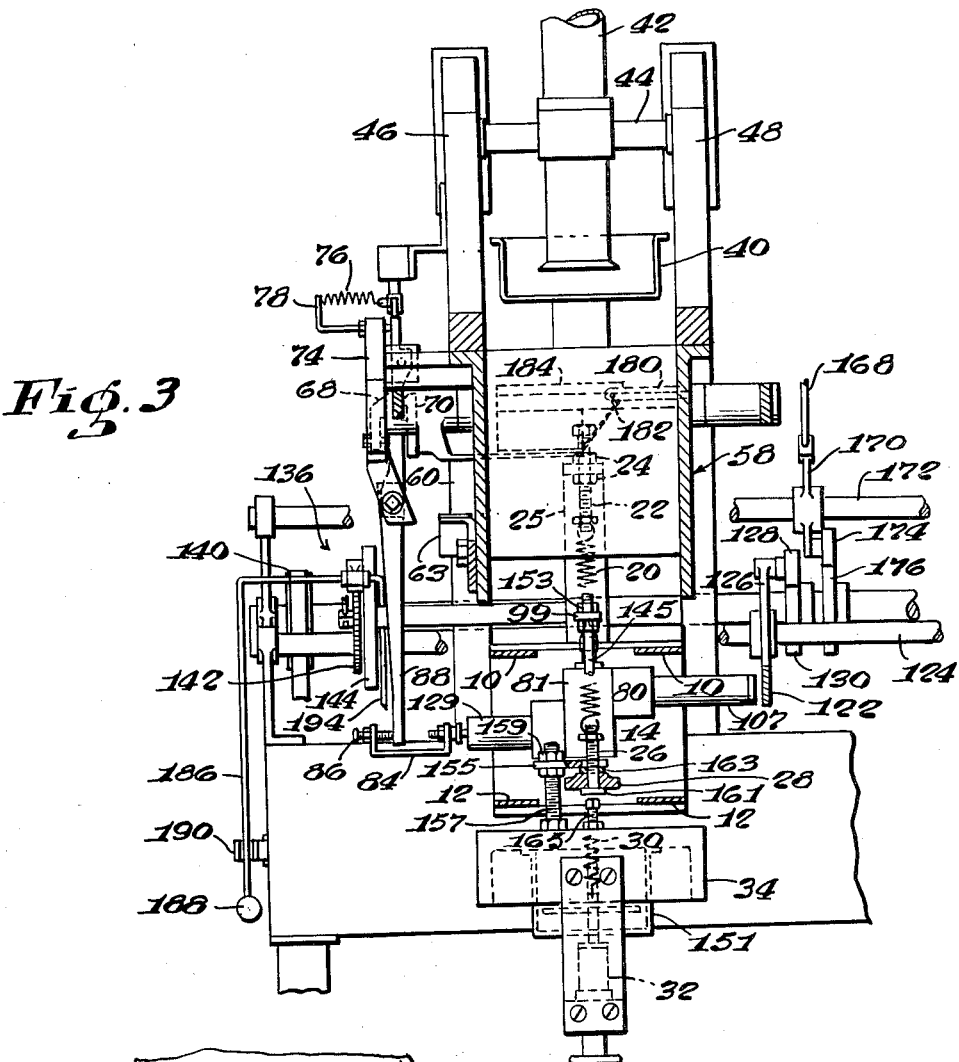
INVENTOR.
Thomas P. Howard
BY
J. Stanley Churchill
ATTORNEY

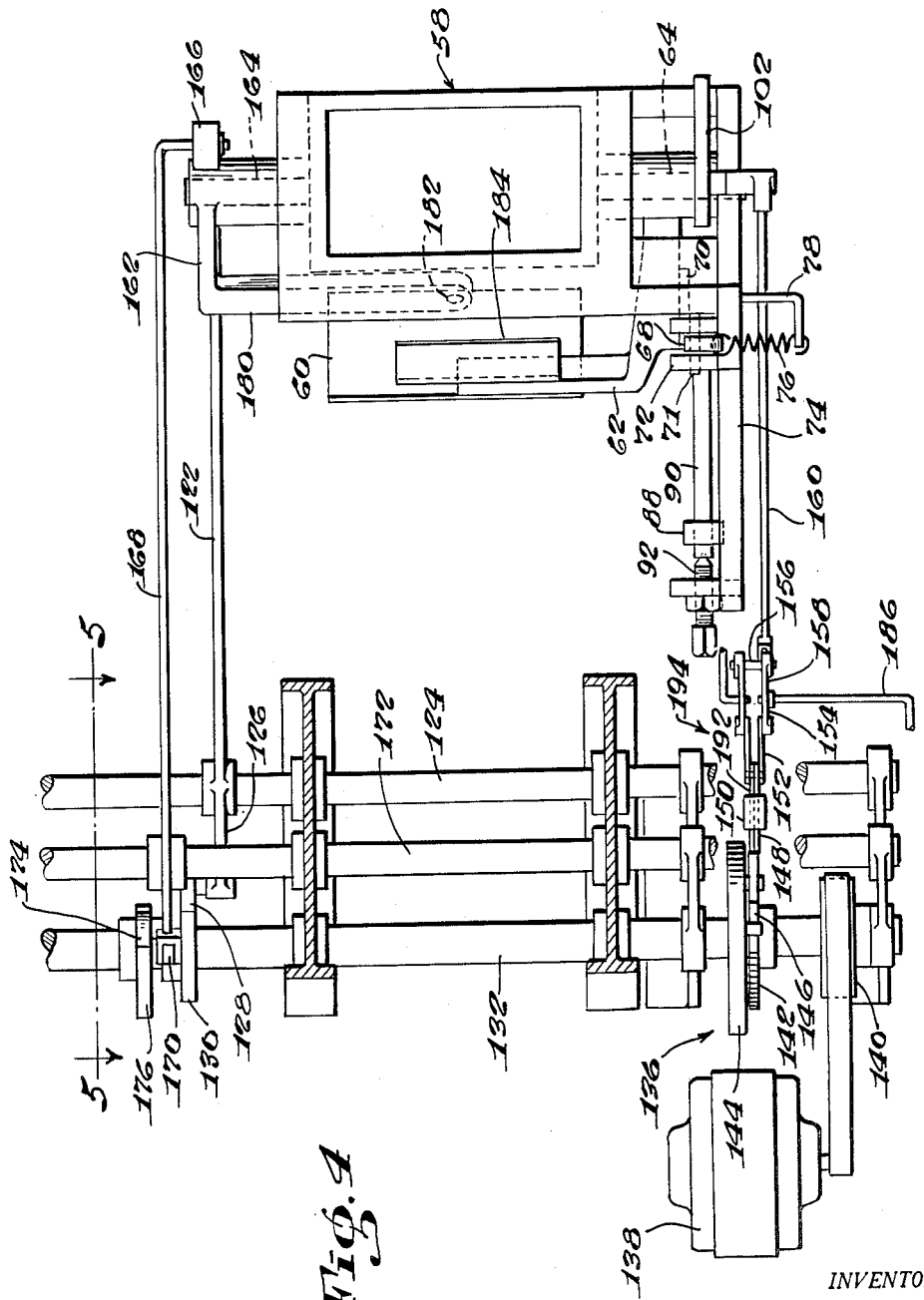

March 15, 1955     T. P. HOWARD     2,704,197
WEIGHING MACHINE
Filed Nov. 28, 1950     7 Sheets-Sheet 4

INVENTOR.
Thomas P. Howard
BY
J. Stanley Churchill
ATTORNEY

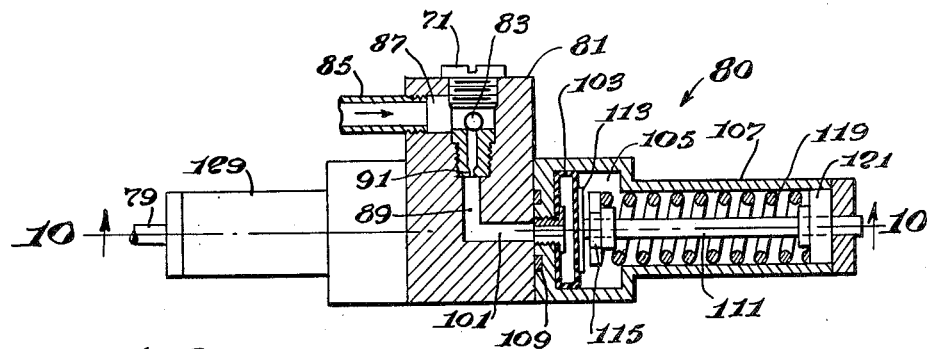
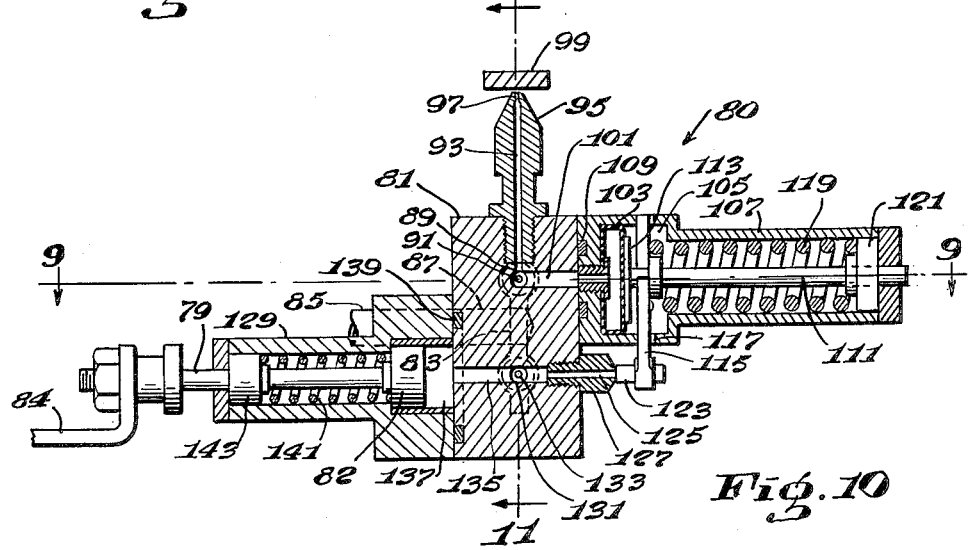
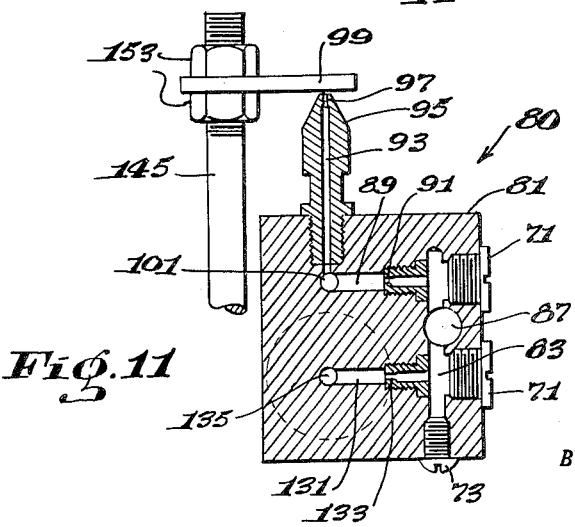

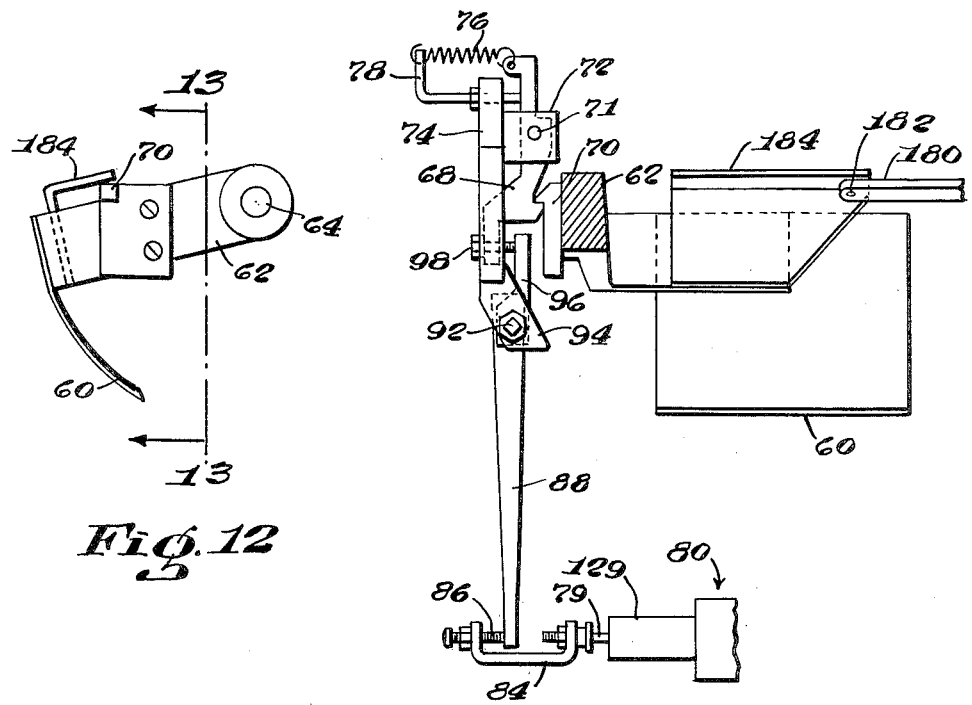
Fig.12
Fig.13
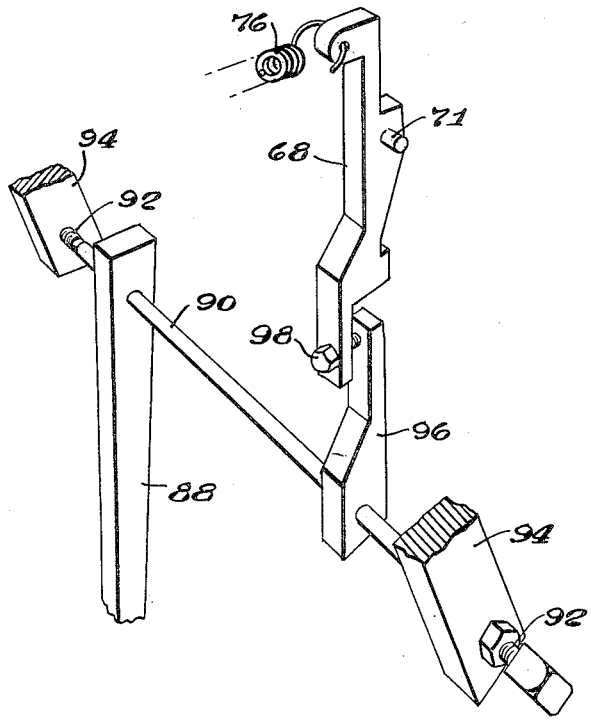
Fig.14
INVENTOR.
Thomas P. Howard
BY J. Stanley Churchill
ATTORNEY

United States Patent Office 2,704,197
Patented Mar. 15, 1955

2,704,197
WEIGHING MACHINE

Thomas P. Howard, Milton, Mass., assignor to Pneumatic Scale Corporation, Limited, Quincy, Mass., a corporation of Massachusetts Application November 28, 1950, Serial No. 197,952

8 Claims. (Cl. 249—2)

This invention relates to a weighing machine.

The object of the invention is to provide a novel, simple, and highly efficient weighing machine for rapidly and accurately weighing flowable solid material.

A further object of the invention is to provide a novel and improved weighing mechanism which may be economically manufactured and possesses structural and operating features which render it superior for many weighing purposes than weighing elements of the prior art of which I am aware.

With these general objects in view, and such others as may appear, the invention consists in the weighing machine, in the weighing mechanism, and in the various structures, arrangements and combinations of parts hereinafter described and particularly defined in the claims at the end of this specification.

Figure 1:
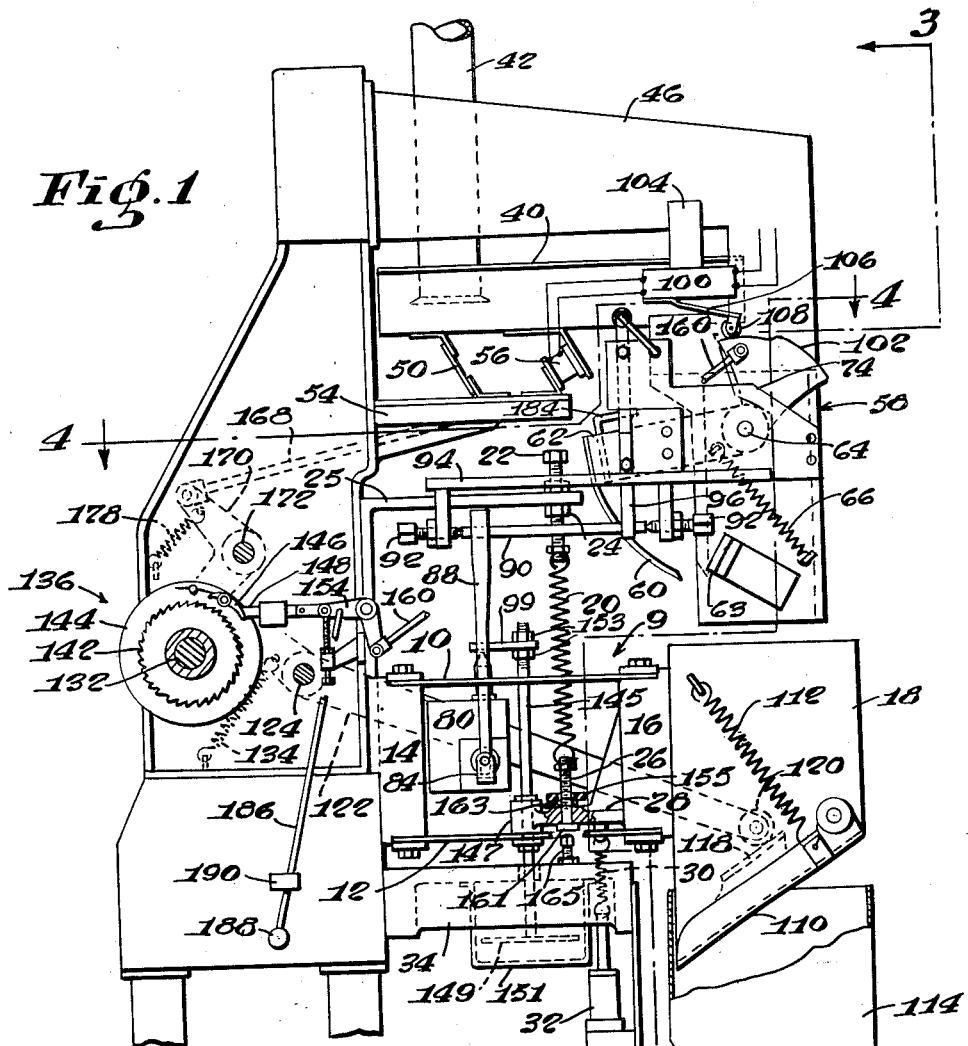
Figure 2:
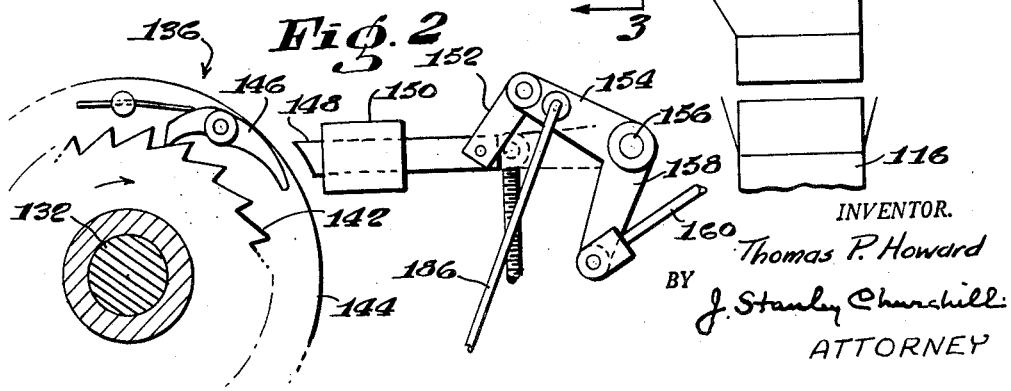
Figure 6:
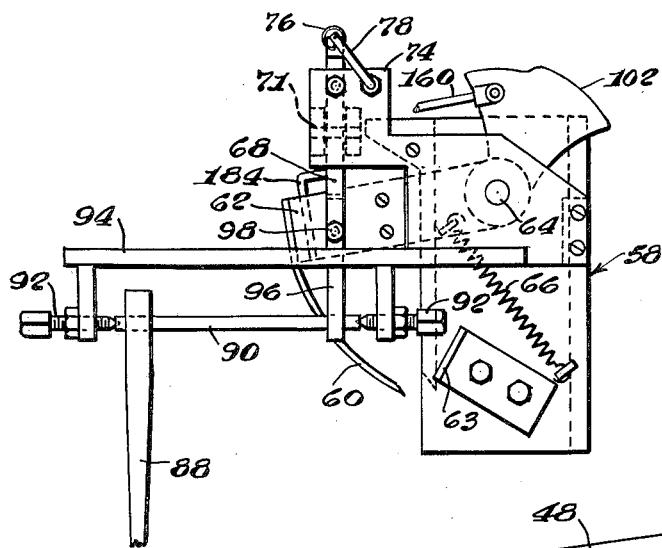
Figure 7:
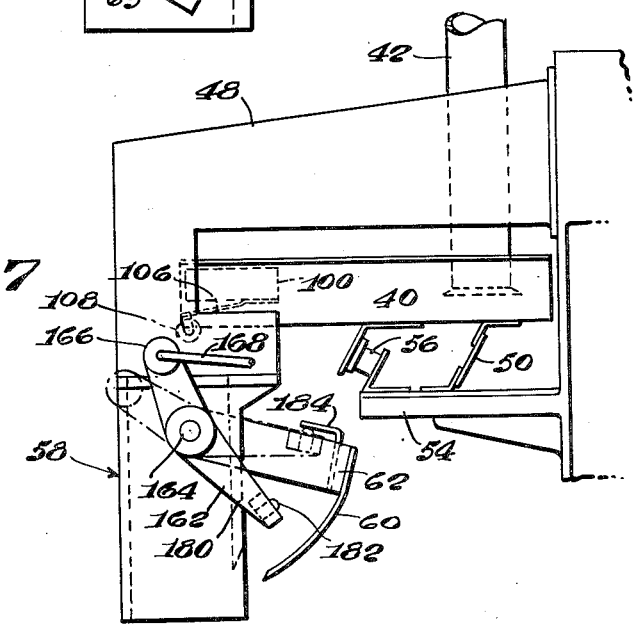
Figure 8:
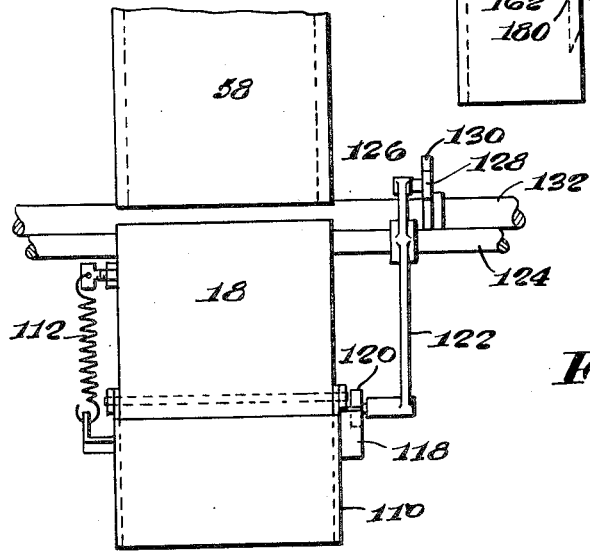
Figure 15:
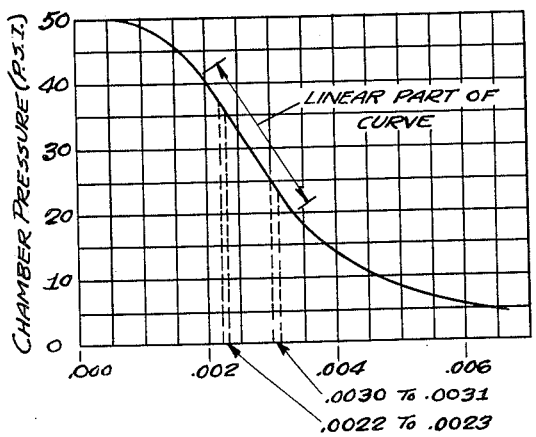
Figure 16:
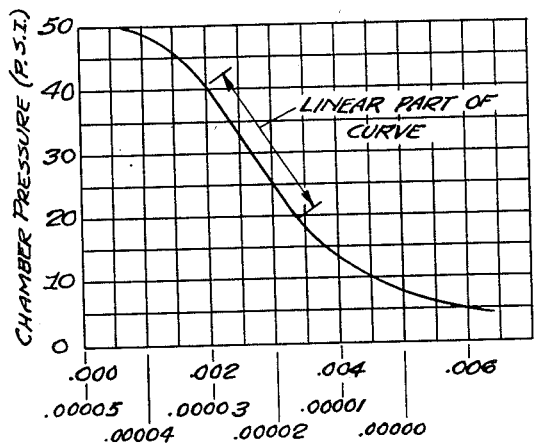

In the drawings illustrating the preferred embodiment of the invention, Fig. 1 is a side elevation of the present weighing machine; Fig. 2 is a detail view in side elevation of a one-revolution clutch for controlling the operation of the weighing machine; Fig. 3 is a cross-sectional view taken on the line 3—3 of Fig. 1; Fig. 4 is a plan view as seen from the line 4—4 of Fig. 1; Fig. 5 is a detail view taken on the line 5—5 of Fig. 4; Fig. 6 is a detail view in side elevation of a portion of the stream-interrupting mechanism; Fig. 7 is a similar view as seen from the opposite side of the machine; Fig. 8 is a front elevation of the weighing receptacle; Fig. 9 is a plan view in horizontal cross section taken on the line 9—9 of Fig. 10 of a pneumatic control unit adapted for cooperation with the present weighing element and arranged to initiate operation of the stream-interrupting mechanism; Fig. 10 is a cross-sectional view of the same taken on the line 10—10 of Fig. 9; Fig. 11 is a cross-sectional view taken on the line 11 of Fig. 10; Fig. 12 is a detail view of the stream-interrupting gate; Fig. 13 is a front elevation of the stream-interrupting gate as viewed from the line 13—13 of Fig. 12 and further illustrating associated latch mechanism arranged to be actuated by the pneumatic control unit to release the stream-interrupting gate; Fig. 14 is a perspective view of the latch mechanism shown in Fig. 13; and Figs. 15 and 16 are graphs to be referred to.

In general, the present weighing machine is particularly adapted for weighing flowable solid material fed in a stream upon a load-receiving member forming a part of a novel weighing mechanism. The novel weighing mechanism embodies a weighing element comprising stiff spring means for supporting the load-receiving member and for controlling the movement thereof, and the stiff springs are selected so that the weighing element has a deflection value lying between the limits of .00002" and .005" per 1% of the load to be weighed, when such a force is applied to the weighing element. Provision is made for feeding the material in a stream onto the load-receiving member and for interrupting the feed at the end of the weighing operation. In order to reduce to a minimum errors which have heretofore occurred in the operation of commercial weighing machines because of variations in the stream flow of the material being weighed, the weighing element including the spring means and load-receiving member is designed so that the weight thereof is reduced to a fraction of the weight of the comparable portions of the weighing mechanism of prior-art weighing machines, so that the response of the weighing element and associated parts to variations in stream flow may be extremely rapid. In practice, the weight of the weighing element and the stiffness of the spring thereof are such as to reduce to an eighth of a second or less the time required for the weighing element to move the load-receiving member from its position occupied at the time such a load is applied to its new position at which the operation of the stream-interrupting mechanism is initiated. Novel and rapidly operating sensitive control means are provided which in cooperation with the aforesaid relatively lightweight and stiff spring-supported weighing element enable the stream to be interrupted with extreme rapidity so that minimum errors occur.

Referring now to the drawing, the invention is herein illustrated as embodied in an automatic net-weight weighing machine of the general type illustrated and described in the United States Patent to S. R. Howard, No. 2,364,902, issued December 12, 1944.

As illustrated in Figs. 1 and 3, the weighing element, indicated generally at 9, comprises a four-bar parallel linkage wherein the top and bottom horizontal links 10 and 12 respectively are cantilever leaf springs of equal length. The springs 10, 12 are attached at one end to a rigid immovable member 14, as shown in Fig. 1, and the second ends of the springs are attached to a second rigid member 16 to which the weighing bucket or other load-receiving member 18 is securely attached as by bolts. The two rigid members 14, 16, together with the springs 10, 12, constitute the four-bar linkage so that when a load is placed within the weighing bucket 18, the weight thereof results in imparting to the bucket a straight line of motion in a vertical direction so that every particle in the weighing bucket moves with the same displacement, direction, and velocity and so that any particle produces the same spring deflection no matter where it is located in the bucket. The first rigid member 14 constitutes a portion of the machine frame and serves as a rigid support for the entire structure of the weighing element. A coil spring 20 having its upper end secured to a supporting bolt 22 adjustably secured by lock nuts 24 in the bracket 25 forming a part of the machine frame serves to exert a counterforce upon the weighing element. The lower end of the spring 20 may be secured to a bolt 26 adjustably secured in a bracket 28 projecting from and forming a part of the second rigid member 16 to which the load-receiving bucket 18 is attached, and this coil spring may serve to counteract the weight of the weighing bucket 18 and associated parts which are mounted upon the ends of the leaf springs 10, 12 so that the desired degree of stiffness may be obtained in the cantilever springs 10, 12 and consequently the desired degree of sensitivity can be obtained irrespective of the weight of the bucket and its contents. For a heavy load the coil spring may be stretched upwards to counteract the load force while for a light load it may be stretched to a lesser degree. The springs 10, 12 will thus deflect the same desired amount per ounce of force in either case. The system is also provided with a secondary light coil spring 30 with screw adjustment including a rotary member 32 adjustably secured in a bracket 34 attached to and forming a part of the machine frame, so that the length of the coil spring 30 may be changed to produce slight changes in tension and hence fine-weight adjustments without stopping the entire machine.

The illustrated weighing machine embodying the above-described novel weighing element includes a vibratory feeder or material-delivery conduit, indicated at 40, into which the material to be weighed is delivered from a source of supply through a supply tube 42 mounted for vertical adjustment in a bracket 44 supported between the side frames 46, 48 as shown in Fig. 3 in order to vary the distance between the mouth of the supply tube and the bottom of the conduit and thus vary the amount of material permitted to flow into the conduit. The vibratory feeder 40 is supported by thin steel straps 50 mounted upon a bracket 54 extending from the machine frame, and is arranged to be vibrated by an electrically operated vibratory motor 56 operatively connected between the bracket 54 and the conduit 40 to effect feeding of the material through the conduit in a substantially uniform stream.

The material-delivery conduit 40 is arranged to be vibrated during the weighing operation to feed a substantially uniform stream of material through a hopper 58 and directly into the weighing or load-receiving bucket 18. As herein shown, the hopper 58 is provided with a material cut-off or stream-interrupting gate comprising a curved plate 60 attached to an arm 62 pivotally mounted on a stud 64 secured to one side of the hopper 58. The material cut-off gate 60 is arranged to be latched in its open position during the weighing operation, and when the material deposited in the weighing bucket 18 reaches a predetermined weight provision is made for releasing the gate to permit it to be rocked by a spring 66 to its closed position to thereby cut off the stream of material.

As best shown in Figs. 12 and 13, the latch mechanism for maintaining the stream-interrupting gate 60 in its open position during the weighing operation includes a pivotally mounted latch member 68 arranged to cooperate with a hook 70 attached to the gate arm 62. The latch member 68 is pivotally mounted at 71 in an extension 72 formed integrally with a supporting plate 74 attached to one side of the hopper 58 and is normally urged in a direction to effect latching of the gate by a spring 76 connected between the upper end of the latch member 68 and a spring stud 78 secured to the supporting plate 74.

The latch member 68 is arranged to be rapidly disengaged to permit rapid closing of the gate 60 upon completion of the weighing operation through connections including sensitive control means herein shown as comprising a pneumatically operated unit, indicated generally at 80, and arranged to be actuated by movement of the weighing element. As illustrated in Fig. 10, the pneumatically operated control unit 80 includes a horizontally reciprocal spring-loaded rod or plunger 79 having a piston 82 at one end and having a U-shaped member 84, see Fig. 3, attached to the outer end thereof, the member 84 being provided with a screw 86 adjustably secured therein and arranged to cooperate with the lower end of an elongated lever 88 fast on a rocker shaft 90 supported by trunnions 92. The trunnions 92 are carried by a supporting bracket 94 attached to the supporting plate 74. A second arm 96 fast on the trunnion shaft 90 is arranged to engage an adjustable screw 98 carried by the lower end of the latch member 68, as illustrated in Fig. 14. In operation, the pneumatically operated and spring-loaded plunger 82 is normally maintained in its outwardly extended position, as shown in Fig. 10, by air pressure, and when the weighing operation is completed the spring-loaded plunger 82 is permitted to move inwardly to the right viewing Fig. 10, thereby effecting rocking of the latch member 68 to release the gate 60 through the connections described. The gate may engage a resiliently faced stop member 63 in its closed position.

Referring now particularly to Figs. 9, 10, and 11, the pneumatically operated unit 80 arranged to cooperate with the cantilever spring-weighing element 9 to control the operation of the material-feeding mechanism may and preferably will embody a pressure-responsive amplification device adapted to effect rapid tripping of the latch mechanism upon minute deflection of the spring beam, and as herein shown, includes a block 81 having a vertical passageway 83 connected to a regulated source of air under pressure by a pipe 85 and passageway 87, the upper end of the vertical passageway communicating with a horizontal chamber 89 through a restricted throat portion 91 arranged to offer a substantial resistance to the flow of air therethrough. The chamber 89, which may be designated as the primary air chamber, in turn communicates with a vertical conduit 93 formed in a jet member 95 attached to the block 81, the member 95 having a small discharge orifice 97 arranged to cooperate with a valve member 99 carried by the weighing unit. The orifice 97 may be designated as the primary discharge orifice. Normally, the valve member 99 is spaced slightly from the orifice 97, and the construction of the pneumatically operated unit is such that a large pressure change occurs upon minute movement of the valve member toward the orifice when the weighing element 9 is deflected through a correspondingly minute distance. A second horizontal chamber 101, arranged at right angles to the chamber 89 and disposed between the restricted throat portion 91 and the discharge orifice 97, is connected to an expansible bellows 103 supported in a chamber 105 formed in a alterally extended hollow member 107, attached to the block 81. The bellows 103 has substantial area and is urged outwardly by the air pressure in the primary air chamber. A suitable resilient sealing ring 109 is provided in a recessed portion of the member 107 for engagement with the adjacent face of the block to provide a tight seal. The bellows 103 is arranged to cooperate with a piston rod 111 supported for horizontal reciprocation in the member 107 and having an enlarged head portion 113 engageable with the outer face or end of the bellows. The rod 111 may be provided with a depending arm 115 fast thereon, the arm extending through upper and lower slots 117 formed in the hollow member 107 for limiting the movement of the rod 111. A spring 119 coiled about the rod 111 and interposed between the arm 115 and a bearing member 121 supported in the hollow member 107 is arranged to normally urge the rod 111 to the left, movement to the right being effected by an increase in pressure in the chamber 101 to inflate or expand the bellows 103 when the valve member 99 is moved toward the discharge orifice 97.

As herein illustrated, the lower end of the arm 115 extends through the member 107 and is provided with a valve 123 for cooperation with the orifice 125 of a second jet member 127 forming a part of and communicating with a secondary air chamber 131. The air chamber 131 communicates through the chamber 135 with a chamber 137 in a laterally extended hollow member 129 attached to the opposite side of the block 81 and in which the spring-loaded rod or plunger 79 for actuating the latch-tripping mechanism is reciprocally mounted. As best shown in Fig. 11, the lower horizontal chamber 131 communicates with the lower end of the vertical passageway 83 through a restricted throat portion 133 and the chamber 131 communicates with the through passageway 135 arranged at right angles to the chamber 131, one end of the passageway 135 communicating with the orifice 125 in the jet member 127, and the other end of the passageway 135 opening into the chamber 137 of the member 129 and in which the piston 82 of the rod 79 is received. A suitable resilient sealing ring 139 may be provided in a recessed portion of the block 81 to prevent escape of air between the block and the hollow member 129. A spring 141 coiled about the rod 79 and interposed between the piston head 82 and a bearing member 143 supported in the hollow member 129 is arranged to normally urge the rod and piston to the right viewing Fig. 10, and when the jet orifice 125 is closed, as illustrated, the pressure in the chamber 137 is sufficient to retain the piston and rod in its outwardly extended position to the left as shown in Fig. 10. Suitable threaded plugs 71, 73 may be used to close the openings formed during the drilling of the various passageways, as illustrated.

As illustrated in Fig. 1, the pneumatically operated control unit 80 may be attached to the rigid member 14 supported by the machine frame, and the valve member 99 may be adjustably supported on a vertical rod 145 secured in a hub portion 147 of the arm 28 forming a part of the second rigid member 16. The lower end of the rod 145 may be extended downwardly and provided with a piston 149 operating in a dash pot 151 attached to the bracket 34. In operation, the valve 99 carried by the weighing element 9 may be adjusted by the nuts 153 so as to normally provide a relatively small space between the valve and the orifice 97 when the spring-beam unit is in its elevated position, and upon minute deflection of the weighing element under the influence of the load, the valve 99 is moved toward the discharge orifice 97 a minute amount thereby effecting a substantial pressure rise in the chamber 101 between the discharge orifice and the throat portion 91 tending to expand the bellows 103 against the pressure of the coil spring 119. When the pressure in the primary air chamber acting on the bellows overcomes the spring the secondary valve 123 is thus moved to the right viewing Fig. 10 to expose the opening 125 in the jet 127 thus reducing the pressure in the chamber 137 and permitting the spring 141 to move the piston rod 79 and the U-shaped arm 84 to the right to trip the latching mechanism and release the stream-interrupting gate 60 through the connection described. As illustrated in Figs. 1 and 3, provision is made for adjustably limiting the movement of the spring-beam unit 9 between upper and lower stops, the upward limit of movement being defined by a laterally extended stop member 155 adjustably secured to a threaded stud 157 fixed in the supporting bracket 34 attached to the machine frame. The stop member 155 may be adjusted on the stud by nuts 159 and may be slotted at its free end to embrace the bolt 26 secured in the arm 28. As shown in Figs. 1 and 3, the bolt 26 is provided with a head 161 and is secured to the arm 28 by a nut 163, and in operation, the upper surface of the nut 163 engages the undersurface of the stop member 155 to limit the upward movement of the weighing element 9, thus in effect providing a scale lock or a fixed initial position of the weighing element relative to the jet orifice 97 at the beginning of the weighing operation. A second stop stud 165 adjustably mounted in the supporting bracket 34 is arranged to engage the head 161 of the bolt 26 to limit the downward movement of the weighing element to prevent damage to the primary escape orifice if any extraneous large forces try to depress the beam too far.

From the description thus far it will be seen that upon minute deflection of the cantilever weighing element 9 under the influence of the load deposited in the weighing receptacle 18 by the feeding mechanism, the stream of material is interrupted by the cut-off gate 60, and as herein shown, provision is also made for simultaneously discontinuing vibration of the material-feeding conduit 40 upon release of the stream-interrupting gate 60. For this purpose, a normally closed switch 100 connected to the vibratory motor 56 is arranged to cooperate with a cam section 102 formed integrally with the gate arm 62. The switch 100 may be supported by a bracket 104 attached to the machine frame, and may be provided with a resilient switch arm 106 having a roller 108 in engagement with the cam section 102. In operation, when the stream-interrupting gate 60 is permitted to rock to its closed position the cam 102 is arranged to open the circuit to stop vibration of the conduit 40 and thus discontinue the feed of the material. Conversely, when the gate is returned to its initial or open position, the cam 102 effects closing of the circuit to start the feeding operation for a succeeding cycle of operation.

As herein shown, the weighing bucket 18 is provided with a pivotally mounted shutter 110, yieldingly retained in its closed position against the bottom of the bucket by a spring 112, and upon completion of the weighing operation, provision is made for opening the shutter to release the weighed load from the weighing bucket, the released material being guided through a funnel 114 and into a carton 116 supported therebeneath. As illustrated in Figs. 1 and 8, the shutter 110 is provided with a raised track portion 118 on one side thereof arranged to be engaged by a roller 120 carried by an elongated cam lever 122 pivotally mounted on a rocker shaft 124 journaled in the machine frame. A second arm 126 of the cam lever is provided with a roller 128 arranged to cooperate with a cam 130 fast on a cam shaft 132. A spring 134 connected to the arm 126 is arranged to maintain the roller 128 against the cam, as better shown in Fig. 5.

In operation, the cam shaft 132 is arranged to be controlled to make one revolution each cycle of operation of the weighing machine, and accordingly the cam shaft may be driven through connections including a one-revolution clutch, indicated generally at 136, which may comprise a clutch of the type illustrated and described in the Howard Patent No. 2,364,902 above referred to and which is arranged to be actuated through connections from the weighing element. As illustrated in Fig. 4, the present driving mechanism may include a motor 138 belted to a pulley 140 formed integrally with a ratchet 142 forming a part of the one-revolution clutch 136. The integral pulley and ratchet may be rotatably mounted on an extension of the cam shaft 132, and a disk 144 fast on the cam shaft carries a spring-pressed pawl 146 arranged to engage the teeth of the ratchet to effect rotation of the shaft. As better shown in Fig. 2, in order to control the operation of the shaft to permit it to make but one revolution each cycle of operation of the weighing machine, a pawl stop 148 slidingly mounted in a bracket 150 is arranged to engage the tail of the pawl to remove the latter from engagement with the teeth of the ratchet when the shaft has made one revolution. The pawl stop 148 is connected by a link 152 to one arm 154 of a lever pivotally mounted at 156, and in the illustrated embodiment of the invention a second arm 158 of the lever is connected by a link 160 to the cam section 102 movable with the stream-interrupting gate 60. Thus, in operation, when the gate 60 is moved to its closed position upon completion of the weighing operation, the pawl stop is withdrawn to permit engagement of the spring-loaded pawl 146 with its ratchet 142 and effect rotation of the cam shaft 132.

During the initial rotation of the cam shaft 132, the cam 130 effects opening of the shutter 110 and release of the material into the carton as above described, and upon continued rotation of the shaft the shutter 110 is permitted to close by virtue of the spring 112. During subsequent rotation of the one-revolution cam shaft, and preferably as it approaches the latter part of its revolution, provision is made for resetting the stream-interrupting gate 60 to its open position to initiate a succeeding weighing cycle, the resetting movement of the gate and its integral cam section 102 effecting extension of the pawl stop 148 into the path of the pawl 146 so as to effect disengagement thereof from its ratchet to stop the cam shaft at the end of one revolution.

As illustrated in Figs. 1 and 7, the resetting or relatching mechanism may comprise a cam-operated resetting arm 162 pivotally mounted on a stud 164 secured to the side of the hopper 58, the stud 164 being in alignment with and disposed on the opposite side of the hopper from the stud 64, as clearly shown in Fig. 4. A second arm 166 of the resetting arm is connected by a link 168 to one arm of a bell crank 170 pivotally mounted on a rocker shaft 172, the second arm of the bell crank 170 having a cam roll 174 for cooperation with a cam 176 fast on the cam shaft 132, see Fig. 5. A spring 178 is arranged to hold the roller against its cam. As better shown in Fig. 4, the resetting arm 162 is provided with a laterally extended portion 180 having a pin 182 secured therein arranged to engage an angle piece 184 secured to the stream-interrupting gate 60, as also illustrated in Figs. 12 and 13. Thus, in the operation of the weighing machine, when the cam shaft approaches the end of its revolution, the gate 60 is rocked to its open position to effect relatching of the latch elements 68, 70 and simultaneously therewith, the pawl stop 148 is extended to discontinue rotation of the cam shaft, and the cam section 102 is moved to operate the switch 100 to start vibration of the feeding conduit 40 whereby to initiate a new cycle of weighing operation. It will be understood that the weighing element 9 automatically returns to its initial or elevated position relative to the orifice 97 of the pneumatic control mechanism 80 in readiness for another weighing operation as soon as the receptacle 18 releases its load and the shutter 110 is again closed.

In practice, the pawl-stop arm 154 may be provided with a depending link 186 having a handle 188 whereby the pawl stop 148 may be manually withdrawn to start operation of the weighing machine. As shown in Figs. 1 and 3, the handle may be engaged in a slotted lug 190 arranged to prevent withdrawal of the pawl stop 148 when the machine is idle, the handle being manually disengaged from the lug and permitted to depend freely from the pawl-stop arm during the automatic operation of the machine. A second pawl stop 192 and similar connecting linkage, indicated generally at 194, may be provided for connection to the carton intake and advancing mechanism, not shown, to assure positioning of a carton under the funnel 114 before starting a new weighing cycle, such mechanism being illustrated and described in the Howard Patent No. 2,364,902 above referred to.

In the illustrated embodiment of the invention, the pneumatically operated control unit is shown and has been described as operating in its primary air circuit by movement of the member 99 toward the primary discharge nozzle 97, but it will be appreciated that if desired the unit may be positioned with respect to the weighing element to operate in the opposite manner, that is, by movement of the member 99 to increase the escape of air from the nozzle 97, and in such an instance the operation of the secondary valve 123 upon movement of the bellows 103 by the spring 119 will be toward the left, viewing Fig. 10, to effect an increase in the air pressure in the secondary air chamber. If desired, both the primary and secondary air circuits may be arranged to operate in the reverse manner, that is, by movement of the member 99 and the secondary valve 123 away from their respective discharge nozzles.

The present pneumatic control unit enables the material-feeding mechanism to be controlled in a simple, practical, rapid, and most efficient manner in response to a minute movement of the weighing element under the influence of the load being fed upon the weighing end of the weighing element. The area of the bellows 103 is sufficiently great to effect substantial amplification of the pressure variation occurring in the primary air chamber of the unit. In other words, a small pressure difference in the primary air chamber produced by a movement of the scale beam through a small fraction of a thousandth of an inch may be made to produce a pressure change in the secondary air chamber of 50 to 100 times the amount of the change in the primary air circuit, and this relatively large pressure change may be used to do the work of effecting direct control of the material-feeding mechanism, as by tripping the controlling latch.

From the foregoing it will be observed that after the pressure in the primary air chamber has built up to a point where it overcomes the spring 119, thereafter as the pressure gradually rises the position of the valve 123 controlling the secondary air jet 125 will be practically a linear measure of the air pressure in the primary circuit. By means of the secondary air jet 125 it is possible to very accurately measure the position of this member 123, and accordingly to very accurately measure minute pressure changes in the primary air chamber.

The pressure characteristics of both the primary and secondary air circuits may be the same or different according to the amount of power desired from the secondary circuit. For ease of explanation it has been assumed that the pressure characteristics are the same, and that their graphs of distance vs. air chamber pressure are those illustrated in Figs. 15 and 16 to which reference is made. As can be seen from these graphs the sensitivity of these air jets in the linear portions of the curves is about 1½ p. s. i. pressure change per .0001" change in the distance being measured. The measuring zone of the jets (the linear part of their pressure curves) is when the surface is from .0019" to .0034" away from the jet orifice. In the case of the secondary jet, this means that it can accurately detect the position of the valve 123 when the air pressure in the primary circuit is such that the valve is moved out this distance against spring 119. Just how accurately the secondary circuit can detect pressure changes in the primary is shown by the following mathematical analysis of a typical pneumatic amplification system:

Sensitivity of jets: $.0001'' = 3/2$ p. s. i. or, (Graphs XV and XVI) 1 p. s. i. $= \dfrac{.0002''}{3} = .000066''$ Area of bellows: 0.2 sq. in. (½" dia.)

Spring constant: 22½ lbs./in. (Spring 119)

A 2 p. s. i. pressure change in the secondary circuit means that the valve 123 must have moved 2 times .000066".

This .000133 inch compression of the retaining spring means that the force change on the spring must be:

(.000133 inch)×(22½ lbs./in.)=.0030 lb. force change

The force change divided by the area of the bellows gives the p. s. i. pressure change in the primary circuit.

$\dfrac{.0030 \text{ lb.}}{0.2 \text{ sq. in.}} = .015$ p. s. i. pressure change This primary circuit pressure change, times the change in the distance being measured per 1 lb. change in the primary circuit pressure, gives the actual distance differential displacement of arm 99 which causes this pressure change.

(.015 p. s. i.)×(.000066" per 1 p. s. i.)=.000001" motion

Therefore, the sensitivity of the assumed pneumatic amplification unit is 2 p. s. i pressure change per 1 millionth of an inch change in the distance being measured.

For any given size of escape orifice in either the primary or secondary air circuits, the smaller the restriction the closer the members 99 and 123 must be to the tip of their respective orifice in order to throttle the escape of air, and hence the more sensitive the jet system. There are two factors which limit the smallness of the restrictions, and both of these are caused by the closeness of the surface of the jet orifice. The measuring zone of the air jet system is usually only that distance which gives a linear pressure change because of the difficulty in calibrating nonlinear portions of the curve. It has been found impractical to operate a system where the measuring zone is closer than .0005" from the jet orifice because of the danger of damaging the jet orifice and because of the necessity of holding the surface surrounding the escape orifice to very close tolerance to insure that it is flat and parallel with the surface of the members 99 and 123 cooperating therewith, and for the further reason that the frictional resistance of the air flowing past the cooperating surfaces with clearance of less than .0005" greatly decreases the sensitivity of the system. Since it is impractical to move the measuring zone closer than .0005" from the jet orifice and since the width of this measuring zone is about equal to this distance because of the mathematical theory of jet measuring systems, the practical width of the measuring band is .0005". Thus movements of the member 99 in small fractions of a thousandths of an inch, as for example a movement of .000001" would produce in a single jet system a pressure change of only .04 p. s. i. when the characteristics of the air jet system are such that movement through the entire measuring band of .0005" produced at 20 p. s. i. pressure difference. A small pressure change of .04 p. s. i. in the air circuit is entirely insufficient to perform the required work of terminating the material-feeding means in the illustrated weighing machine, and accordingly the amplification of this .04 p. s. i. pressure change per .000001" motion to a much larger figure of about 2 p. s. i per .000001" by the secondary jet system enables the weighing operation to be sensitive to movements in the order of magnitude of small fractions of a thousandth of an inch while enabling the material-feeding means to be controlled rapidly and positively.

In weighing practice, it has been determined that a minimum limit exists on the size of the restricted throat in the primary air circuit, and this minimum is dependent on the time required for the air to pass through this extremely small restricted throat to make the pressure in chambers 89 and 101 vary according to the position of valve member 99. It has also been determined that a maximum limit exists in the size of the primary air escape orifice, as beyond this maximum size the escaping air exerts an excessive force on the weighing element causing it to bounce and detracting from the accuracy of the weighing element. The practical limits which I have found to exist are as follows:

The maximum practical ranges in the sizes of the restricted throats and discharge orifices for the primary and secondary air circuits correspond to the areas of circles having the following diameters:

PRIMARY CIRCUIT

| Restricted Throat | Escape Orifice |
|---|---|
| .005" to .040" | .010" to .080" |
| SECONDARY CIRCUIT | |
| .005" to .060" | .010" to .120" |

The preferred range is as follows:

PRIMARY CIRCUIT

| .008" to .015" | .016" to .030" |
|---|---|
| SECONDARY CIRCUIT | |
| .015" to .030" | .030" to .060" |

As has been pointed out above the embodiment of the pneumatic amplification unit illustrated in Fig. 9 enables a small energy change in the primary air circuit caused by a minute change in position of the member 99 connected to the weighing element to be accurately amplified into a large energy change in the secondary air circuit so that the latter will have considerable power and be capable of performing the work. The amount of power possessed by the secondary air circuit can be increased by increasing the input air pressure to the secondary air circuit, and if so preferred a separate air input can be connected to each circuit so that a low-line pressure such as 15 p. s. i. can be used in the primary and a high pressure can be used in the secondary, as for example 100 p. s. i. The size of the restricted throat and the escape orifice in the secondary air circuit is preferably larger than those in the primary, thereby permitting a relatively quick flow of air, and this in turn contributes to the increase in power as well as increasing the speed with which the secondary air circuit may operate to terminate the feeding of the material to the scale beam at the end of the weighing operation. This production of quick power is most essential in weighing, as it reduces to a minimum any error attributable to the time delay from the time the weighing element reaches the tripping point until the material-feeding shutter closes.

It will be observed by reference to Figs. 15 and 16 that with an input pressure of 50 p. s. i. the primary air circuit's pressure changes from 50 to 5 p. s. i. when the primary jet clearance changes from 0 to .006". However, according to the size of the bellows 103 and the prestressing of the retaining spring 119, the member 115 only moves when the pressure in the primary circuit has built up to a certain point, which in the assumed case is about 23 p. s. i., as shown in Fig. 15. As the pressure increases from 23 p. s. i. to 24 p. s. i. the member 115 may move .006", this motion in turn being the total measuring range of the secondary jet. Hence the secondary jet only measures a change in the primary jet clearance of a small range, that is, .00005", as shown in graph Fig. 16. By varying the preloading of the spring 119 the secondary jet's measuring zone can be moved to different places in the primary measuring zone. For example, with a preloading such that the member 115 will not move until the primary pressure builds up to 23 p. s. i., see graph of Fig. 15, the secondary circuit amplifies the primary circuit's energy change as the primary jet clearance changes from .0030" to .0031", whereas if the preloading is increased so that the member 115 will not move until the primary pressure has risen to 36 p. s. i. the secondary circuit operates when the primary air jet clearance is between .0022" and .0023".

Hence it is seen that only by using the combination of a relatively heavy spring mounting and an ultra-sensitive detecting mechanism as disclosed in the present invention is it possible and practical to obtain the minimum weight of the moving weighing element, and the minimum deflection rate of the same necessary to reduce the time delay to less than ⅛ of a second between the instant when there is a given force acting on the weighing element and the instant when the control mechanism is actuated to terminate the feed so that the added increment of goods fed during this delay will be kept to a minimum and hence the inaccuracies in the final weight due to stream variations during this time delay will be small enough to make possible the accurate weighing of material which cannot be fed in a uniform stream and heretofore could not be rapidly and accurately weighed.

The advantages may be summarized as follows: The weighing structure is light in weight, possesses low momentum, embodies no knife edges and other movable parts subject to friction, has great rigidity, is inexpensive to construct, and the entire weighing machine is less subject to the effects of external vibration. The primary advantage of the present type of weighing system is to obtain a means of accurately measuring weight with a very small weighing element deflection which together with light construction gives very low momentum, thus making the system extremely responsive to changes of force coming from sudden stream variations and also greatly increasing the speed of weighing because of the very fast weighing action.

Having thus described the invention, what is claimed is:

1. Feed control means for a weighing machine, comprising: a weighing element, material feeding means, and pneumatically operated control mechanism cooperating with the weighing element and operatively connected to the material feeding means for controlling the operation thereof, said pneumatically operated control mechanism comprising a primary air chamber, means having a restricted throat for conducting air under pressure to said primary air chamber, said primary air chamber being provided with a small discharge orifice, means operatively connected with the weighing element and movable therewith during the weighing operation relative to said discharge orifice along the path of flow of the air to thereby control the rate of escape of air therefrom and to thereby vary the air pressure within the primary air chamber in response to minute movements of the weighing element, a secondary air chamber, means for conducting air under pressure through a restricted throat and into said secondary air chamber, said secondary air chamber being provided with a discharge orifice through which air may escape from said chamber, a movable member of substantial area pneumatically connected to the primary air chamber whereby to effect amplification of the pressure changes within the primary air chamber, said movable member having provision for yieldingly resisting movement caused by changes in the air pressure in the primary chamber, and a member connected to said movable member to be moved relative to the secondary orifice, and means operating in response to variations in the air pressure in the secondary air chamber operatively connected with and controlling the operation of the material feeding means.

2. Feed control means for a weighing machine, comprising: a weighing element, material feeding means, and pneumatically operated control mechanism cooperating with the weighing element and operatively connected to the material feeding means for controlling the operation thereof, said pneumatically operated control mechanism comprising a primary air chamber, means having a restricted throat for conducting air under pressure to said primary air chamber, said primary air chamber being provided with a small discharge orifice, means operatively connected with the weighing element and movable therewith during the weighing operation relative to said discharge orifice to thereby control the rate of escape of air therefrom and to thereby vary air pressure within the primary air chamber in response to minute movements of the weighing element, means responsive to said variations in air pressure within said primary air chamber for amplifying such variations, and means operating in response to the amplified variations operatively connected with and controlling the operation of the material feeding means.

3. Feed control means for use in a weighing machine, comprising: a plurality of vertically spaced and substantially parallel leaf springs of substantially the same length, each secured at its inner end in fixed relation to said support and to each other, the outer ends of said leaf springs being secured to a rigid member, said rigid member being provided with supporting means for supporting the article or material to be weighed, said leaf springs being relatively stiff and having a deflection value between the limits of .00002" and .005" per 1% of the load to be weighed when such a force is applied to the supporting means, material-feeding means for feeding the load in a stream, and sensitive control means operatively connected to the material-feeding means for controlling the operation thereof, said control means being actuatable in response to predetermined deflection of the leaf springs.

4. Feed control means for use in a weighing machine, comprising: a support, a plurality of vertically spaced and substantially parallel leaf springs of substantially the same length, each secured at its inner end in fixed relation to said support and to each other, the outer ends of said leaf springs being secured to a rigid member, said rigid member being provided with supporting means for supporting the article or material to be weighed, said leaf springs being relatively stiff and having a deflection value between the limits of .00002" and .005" per 1% of the load to be weighed when such a force is applied to the supporting means, material-feeding means for feeding the load in a stream, and sensitive pneumatic control means operatively connected to the material-feeding means for controlling the operation thereof to control the feed, said control being actuatable in response to predetermined deflection of the leaf springs.

5. A feed control means for use in a weighing machine, comprising: a support, a plurality of vertically spaced and substantially parallel leaf springs of substantially the same length, each secured at its inner end in fixed relation to said support and to each other, the outer ends of said leaf springs being secured to a rigid member, said rigid member being provided with supporting means for supporting the article or material to be weighed, said leaf springs being relatively stiff and having a deflection value between the limits of .00002" and .005" per 1% of the load to be weighed when such a force is applied to the supporting means, material-feeding means for feeding the load in a stream, and pneumatically operated control mechanisms cooperating with the leaf springs in response to predetermined deflection of said leaf springs and operatively connected to the material-feeding means for controlling the operation thereof, said pneumatically operated control mechanism comprising a primary air chamber, means having a restricted throat for conducting air under pressure to said primary air chamber, said primary air chamber being provided with a small discharge orifice, means operatively connected with the leaf springs and movable therewith relative to said discharge orifice during the deflection of said leaf springs as the load is applied to thereby control the rate of escape of air therefrom and to thereby vary the air pressure within the primary air chamber in response to minute movements of the leaf springs, amplifying means responsive to said variations in air pressure within said primary air chamber, and means operating in response to the amplified variations for controlling the operation of the material-feeding means.

6. In a weighing machine, in combination, a weighing element including a plurality of vertically spaced and substantially parallel leaf springs, load receiving means carried by said leaf springs, material feeding means for feeding material to said load receiving means, and pneumatically operated control mechanism cooperating with the weighing element and operatively connected to the material-feeding means for controlling the operation thereof, said pneumatically operated control mechanism comprising a primary air chamber, means having a restricted throat for conducting air under pressure to said primary air chamber, said primary air chamber being provided with a small discharge orifice, means operatively connected with the weighing element and movable therewith during the weighing operation relative to said discharge orifice to thereby control the rate of escape of air therefrom and to thereby vary the air pressure within the primary air chamber in response to minute movements of the weighing element, amplifying means responsive to said variations in air pressure within said primary air chamber, and means operating in response to the amplified variations for controlling the operation of the material-feeding means.

7. Feed control means for a weighing machine comprising: a weighing element, material feeding means, and pneumatically operated control mechanism cooperating with the weighing element and operatively connected to the material feeding means for controlling the operation thereof, said pneumatically operated control mechanism comprising a primary air chamber, means having a restricted throat for conducting air under pressure to said primary air chamber, said primary air chamber having a restricted throat ranging in area corresponding to circles having diameters from .005" to .040" and being provided with a small discharge orifice ranging in area corresponding to circles having diameters from .010" to .080", means operatively connected with the weighing element and movable therewith during the weighing operation relative to said discharge orifice along the path of flow of the air to thereby control the rate of escape of air therefrom and to thereby vary the air pressure within the primary air chamber in response to minute movements of the weighing element, a secondary air chamber, means for conducting air under pressure through a restricted throat and into said secondary air chamber, said secondary air chamber being provided with a discharge orifice through which air may escape from said chamber, a movable member of substantial area pneumatically connected to the primary air chamber whereby to effect amplification of the pressure changes within the primary air chamber, said movable member having provision for yieldingly resisting movement caused by changes in the air pressure in the primary chamber, and a member connected to said movable member to be moved relative to the secondary orifice, and means operating in response to variations in the air pressure in the secondary air chamber operatively connected with and controlling the operation of the material feeding means.

8. Feed control means for a weighing machine, comprising: a weighing element, material feeding means, and pneumatically operated control mechanism cooperating with the weighing element and operatively connected to the material feeding means for controlling the operation thereof, said pneumatically operated control mechanism comprising a primary air chamber, means having a restricted throat for conducting air under pressure to said primary air chamber, said primary air chamber having a restricted throat ranging in area corresponding to circles having diameters from .005" to .040" and being provided with a small discharge orifice ranging in area corresponding to circles having diameters from .010" to .080", means operatively connected with the weighing element and movable therewith during the weighing operation relative to said discharge orifice along the path of flow of the air to thereby control the rate of escape of air therefrom and to thereby vary the air pressure within the primary air chamber in response to minute movements of the weighing element, a secondary air chamber, means for conducting air under pressure through a restricted throat and into said secondary air chamber, said secondary air chamber being provided with a discharge orifice through which air may escape from said chamber, a movable member of substantial area pneumatically connected to the primary air chamber whereby to effect amplification of the pressure changes within the primary air chamber, said movable member having provision for yieldingly resisting movement caused by changes in the air pressure in the primary chamber, and a member connected to said movable member to be moved relative to the secondary orifice, the secondary air circuit embodying a restricted throat ranging in area corresponding to circles having diameters of from .005" to .060" and an escape orifice ranging in area corresponding to circles having diameters from .010" to .120", and means operating in response to variations in the air pressure in the secondary air chamber operatively connected with and controlling the operation of the material feeding means.

References Cited in the file of this patent

UNITED STATES PATENTS

| Number | Name | Date |
|---|---|---|
| 66,524 | Shaler | July 9, 1867 |
| 830,682 | Soderquist | Sept. 11, 1906 |
| 1,233,124 | Powers | July 10, 1917 |
| 2,264,254 | Brandt | Nov. 25, 1941 |
| 2,264,562 | Bryant | Dec. 2, 1941 |
| 2,286,282 | Joesting | June 16, 1942 |
| 2,364,902 | Howard | Dec. 12, 1944 |
| 2,408,842 | Garretson | Oct. 8, 1946 |
| 2,545,118 | St. Clair | Mar. 13, 1951 |
| 2,634,081 | Knobel | Apr. 7, 1953 |
| 2,634,082 | Knobel | Apr. 7, 1953 |